United States Patent [19]

Darms et al.

[11] 4,115,231
[45] Sep. 19, 1978

[54] CROSSLINKABLE MIXTURES OF OLIGOMERS OR POLYMERS AND DIAMINES

[75] Inventors: Roland Darms, Therwil; Vratislav Kvita, Muttenz; Gerd Greber, Binningen, all of Switzerland

[73] Assignee: Ciba-Geigy Corporation, Ardsley, N.Y.

[21] Appl. No.: 748,016

[22] Filed: Dec. 6, 1976

[30] Foreign Application Priority Data

Dec. 19, 1975 [CH] Switzerland .................. 16512/75

[51] Int. Cl.² .............................................. C08G 73/12
[52] U.S. Cl. ........................... 204/159.22; 204/159.11; 204/159.14; 528/322; 528/170; 528/229; 528/321; 528/311; 528/221
[58] Field of Search ........ 260/47 CP, 47 UA, 78 UA, 260/78 TF, 65, 75 N, 50, 49; 204/159.11, 159.14, 159.22

[56] References Cited

U.S. PATENT DOCUMENTS

| | | | |
|---|---|---|---|
| 3,625,912 | 12/1971 | Vincent et al. | 260/30.2 |
| 3,639,357 | 2/1972 | Cohen | 260/78 UA |
| 3,666,720 | 5/1972 | Nieid et al. | 260/47 UA |
| 3,671,490 | 6/1972 | Bargain | 260/47 CP |
| 3,689,464 | 9/1972 | Holub et al. | 260/78 UA |

*Primary Examiner*—Lester L. Lee
*Attorney, Agent, or Firm*—Luther A. R. Hall

[57] ABSTRACT

Crosslinkable mixtures of oligomers or polymers, containing terminal imidyl groups, and diamines are described, for example mixtures of a polyamide oligomer or polyamide-acid oligomer, or terminal polyamide polymer or polyamide-acid polymer, having maleimidylphthalic acid groups, and a diamine. These mixtures and the pre-polymers obtainable therefrom are soluble in customary organic solvents, and in general they can also be processed from the melt. The crosslinked products obtainable therefrom are distinguished in particular by their good thermo-oxidative stability.

11 Claims, No Drawings

CROSSLINKABLE MIXTURES OF OLIGOMERS OR POLYMERS AND DIAMINES

The present invention relates to crosslinkable mixtures of oligomers or polymers, containing terminal imidyl groups, and diamines, as well as to the prepolymers and crosslinked products obtainable therefrom.

The crosslinkable mixtures according to the invention consist of at least one oligomer or polymer of the formula I*a* or I*b*

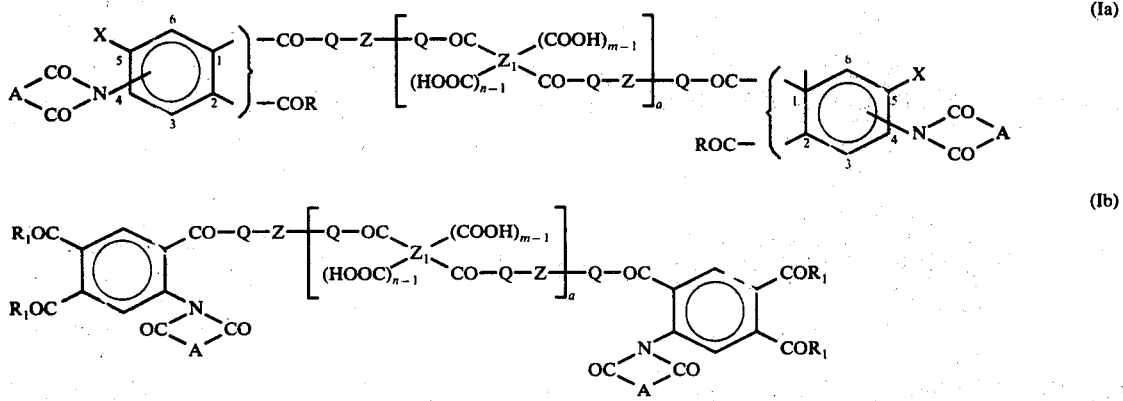

(I*a*)

(I*b*)

or of a corresponding cyclised derivative, and of at least one diamine of the formula II $$HQ - Z_2 - QH \qquad (II),$$

whereby the molar ratio of oligomer or polymer of the formula I*a* and/or I*b*, or of a corresponding cyclised derivative, to diamine of the formula II is between about 1.2 : 1 and 50 : 1, and wherein:

the X s independently of one another represent hydrogen or, if the radical

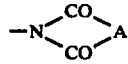

is in the 4-position of the benzene ring, also —COR$_2$,
the R s and R$_2$ s independently of one another represent a hydroxyl group, an unsubstituted or substituted phenoxy group, an alkoxy group having 1-18 carbon atoms or an —O⁻M⁺ group,
the R$_1$ s independently of one another represent a hydroxyl group, an unsubstituted or substituted phenoxy group, an alkoxy group having 1-18 carbon atoms, an —O⁻M⁺ group, or
two adjacent R$_1$ together represent the —O— grouping,
the A s independently of one another represent a radical of the formula

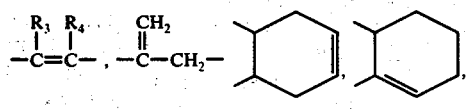

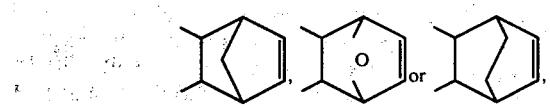

R$_3$ and R$_4$ independently of one another represent hydrogen, chlorine, bromine or methyl,
M⁺ represents an alkali metal cation, a trialkylammonium cation having 3-24, especially 3-12, carbon atoms or a quaternary ammonium cation,
*a* represents a number from 1-100, preferably a number from 1-60, and particularly a number from 1-10,
*m* and *n* independently of one another represent the number 1 or 2,
the Z s and Z$_2$ s independently of one another represent an aliphatic radical having at least 2 carbon atoms, a cycloaliphatic, carbocyclic-aromatic or heterocyclic-aromatic radical,
the Q s represent —NH—, or
—Q—Z—Q— or —Q—Z$_2$—Q— represent the grouping

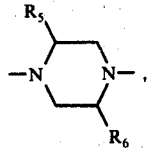

the Z$_1$ s represent an aliphatic radical having at least two carbon atoms, or a cycloaliphatic, carbocyclic-aromatic or heterocyclic-aromatic radical, in which the carbonamide groups and carboxyl groups are bound to different carbon atoms, and the carboxyl groups, if Z$_1$ represents a cyclic radical and at least one of *m* and *n* represents the number 2, are each in the ortho-position with respect to a carbonamide group, and
R$_5$ and R$_6$ independently of one another represent hydrogen, methyl or phenyl.

The two A s in the formula I*a* and I*b* represent preferably identical radicals as defined, particularly a radical of the formula

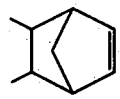

and especially a radical of the formula —CH=CH—.

If R, R$_1$ or R$_2$ represent substituted phenoxy groups, these are, in particular, nitro groups, alkyl or alkoxy groups having 1 or 2 carbon atoms, or phenoxy groups substituted by halogen atoms, especially chlorine or fluorine, such as the 2-, 3- or 4-nitrophenoxy group, 2,4- or 3,5-dinitrophenoxy group, 3,5-dichlorophenoxy group, the pentachlorophenoxy group, 2-methylphenoxy group or 2-methoxyphenoxy group.

Alkoxy groups R, $R_1$ and $R_2$ can be straight-chain or branched-chain. Examples which may be mentioned are: the methoxy, ethoxy, n-propoxy, isopropoxy, n-butoxy, tert-butoxy, hexyloxy, octoxy, decyloxy, dodecyloxy, tetradecyloxy and octadecyloxy group. The groups preferred are unsubstituted phenoxy groups or alkoxy groups having 1–12 carbon atoms and especially 1–4 carbon atoms.

If R, $R_1$ or $R_2$ represent an $-O^-M^+$ group, $M^+$ represents, for example, the lithium, sodium, potassium, trimethylammonium, triethylammonium, methyl-diethylammonium or tri-n-octylammonium cation. Examples of quaternary ammonium cations $M^+$ are the benzyltrimethylammonium and tetramethylammonium cation. $M^+$ preferably represents the sodium cation.

The R s preferably each represent a hydroxyl group and the $R_2$ s each a hydroxyl group or an alkoxy group having 1–4 carbon atoms. The $R_1$ s preferably each represent an alkoxy group having 1–4 carbon atoms, particularly however a hydroxyl group; or two adjacent $R_1$ s together form the $-O-$ grouping.

In the formulae Ia and Ib, the individual Q, Z, $Z_1$, m and n can have different meanings.

Groups or radicals as defined which are represented by Z and $Z_2$ can be unsubstituted or substituted, e.g. by halogen atoms such as fluorine, chlorine or bromine, or by alkyl or alkoxy groups each having 1 to 4 carbon atoms.

Suitable aliphatic radicals Z or $Z_2$ are, in particular, straight-chain or branched-chain alkylene groups having 2 to 12 carbon atoms, especially unsubstituted alkylene groups having 2 to 10 carbon atoms, and the alkylene chain can also be interrupted by hetero atoms, such as O, S or N atoms.

Z and $Z_2$ as a cycloaliphatic radical represent, e.g., the 1,3- or 1,4-cyclohexylene group, the 1,4-bis-(methylene)-cyclohexane group or the dicyclohexylmethane group.

If Z and $Z_2$ represent carbocyclic-aromatic radicals, these are preferably monocyclic, condensed polycyclic or uncondensed bicyclic aromatic radicals, and in the case of the last-mentioned the aromatic nuclei can be bound together by way of a bridge member.

Suitable bridge members which may be mentioned are, for example:

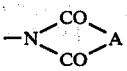

wherein
$Q_1$ represents an alkyl group having 1–6, preferably 1–4, carbon atoms, or a phenyl group.

Uncondensed bicyclic aromatic radicals Z or $Z_2$ can also be bound together by way of two bridge members, such as two $-SO_2$ groups.

If Z or $Z_2$ represent a heterocyclic-aromatic radical, such radicals are, in particular, heterocyclic-aromatic 5- or 6-membered rings containing O, N and/or S.

If $Z_1$ represents an aliphatic radical, such radicals are preferably unsubstituted, straight-chain or branched-chain, saturated alkylene groups having 1–12 carbon atoms, especially 2–10 carbon atoms.

Cycloaliphatic radicals represented by $Z_1$ are, in particular, 5- or 6-membered cycloalkylene groups.

If $Z_1$ represents a carbocyclic-aromatic radical, this contains preferably at least one 6-membered ring; such radicals are, in particular, monocyclic, condensed polycyclic or polycyclic radicals with several cyclic, condensed or uncondensed systems, which can be bound together direct or by way of bridge members. Suitable bridge members are the groups mentioned in the foregoing in the discussion of Z and $Z_2$.

If $Z_1$ represents a heterocyclic-aromatic radical, possible ring systems are, in particular, 5- or 6-membered heterocyclic-aromatic, optionally benzo-condensed, ring systems containing O, N and/or S.

Carbocyclic-aromatic or heterocyclic-aromatic radicals represented by $Z_1$ can also be substituted, for example by nitro groups, alkyl groups having 1–4 carbon atoms, halogen atoms, especially chlorine, or silyl groups or sulphonic acid groups or sulphamoyl groups.

The individual Z s or $Z_2$ s in the case where Q = $-NH-$ independently of one another preferably represent an unsubstituted alkylene group having 2–12 carbon atoms, or a monocyclic or uncondensed bicyclic aromatic radical which is unsubstituted or substituted by halogen atoms, alkyl or alkoxy groups each having 1–4 carbon atoms, and in the case of the uncondensed bicyclic aromatic radical the aromatic nuclei can be bound together direct or by way of the bridge member $-O-$, $-CH_2-$ or $-SO_2-$. The individual $Z_1$ s independently of one another preferably represent an unsubstituted alkylene group having 2–10 carbon atoms, or an unsubstituted monocyclic aromatic radical, an unsubstituted condensed polycylic aromatic radical or an uncondensed bicyclic aromatic radical, and in the case of the last-mentioned, the aromatic nuclei can be bound together by way of the bridge member $-O-$ or $-CO-$.

Of the oligomers and polymers of the formula Ia, those are preferred wherein the two radicals

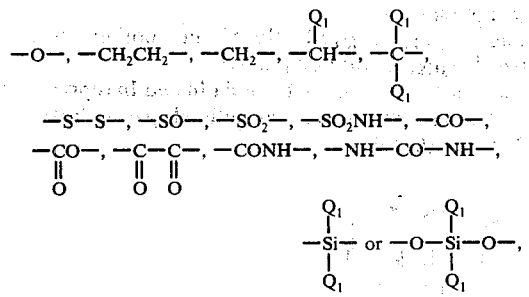

independently of one another are in the 3- or 4-position of the benzene ring, R represents a hydroxyl group, X represents hydrogen and A represents the radical $-CH=CH-$, as well as the corresponding cyclised derivatives.

Among the oligomers and polymers of the formula Ib, those are preferred wherein the $R_1$ s each represent an alkoxy group having 1–4 carbon atoms, and especially those wherein the $R_1$ s each represent a hydroxyl group, or two adjacent $R_1$ s together form the $-O-$ grouping, and the corresponding cyclised derivatives.

According to a further preferred embodiment, there are used for the mixtures according to the invention oligomers or polymers of the formula Ia or Ib wherein Q represents $-NH-$, Z represents an unsubstituted alkylene group having 2–10 carbon atoms, or a carbocyclic-aromatic radical, particularly the 1,3- or 1,4-phenylene group, the 4,4'-diphenyl ether group, the 4,4'-diphenylsulphone group or the 4,4'-diphenylmethane group, and $Z_1$ represents an unsubstituted alkylene group having 2–10 carbon atoms, or a carbocyclic-aromatic radical, especially the 1,3- or 1,4-phenylene group, a benzenetriyl or benzenetetrayl group or the benzophenone ring system.

More particularly preferred are mixtures according to the invention with oligomers or polymers of the formula I$a$ or I$b$, wherein A, X, R and $R_1$ have the preferred meanings mentioned in the foregoing, $a$ represents an integer from 1–10 and Q represents —NH—, and wherein $m$ and $n$ represent the number 1, Z represents the 1,3- or 1,4-phenylene group, the 4,4'-diphenylmethane group or 4,4'-diphenyl ether group, and $Z_1$ represents an alkylene group having 2–10 carbon atoms, the 1,3- or 1,4-phenylene group, with however only one of Z and $Z_1$ representing a 1,4-phenylene group;

$m$ and $n$ represents the number 2, Z represents the 4,4'-diphenylmethane or 4,4'-diphenyl ether group, and $Z_1$ represents a benzenetetrayl group or the benzophenone ring system;

per structual element $a$, $m$ represents the number 1 and $n$ the number 2, Z represents the 4,4'-diphenylmethane group or 4,4'-diphenyl ether group, and $Z_1$ represents a benzenetriyl group;

as well as the corresponding cyclised derivatives.

As diamines are preferably used compounds of the formula II wherein Q represents —NH—, and $Z_2$ represents an unsubstituted alkylene group having 2–10 carbon atoms, or a carbocyclic-aromatic radical, particularly the 1,3- or 1,4-phenylene group, the 4,4'-diphenylsulphone group and, in particular, the 4,4'-diphenylmethane group or 4,4'-diphenyl ether group.

It is also possible to use mixtures of different oligomers or polymers of the formula I$a$ or I$b$, and/or mixtures of different diamines of the formula II.

The molar ratio of the oligomers or polymers of the formula I$a$ and/or I$b$, or of the corresponding cyclised derivatives, to the diamines of the formula II is preferably between about 1.3 : 1 and 10 : 1.

The oligomers or polymers of the formula I$a$ or I$b$ can be obtained by a process wherein
(a) a compound of the formula III$a$

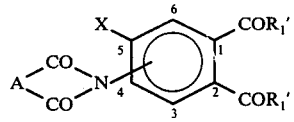

(IIIa)

or
(b) a compound of the formula III$b$

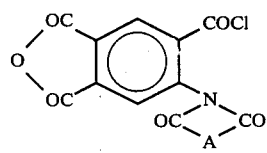

(IIIb), or a mixture of two different compounds of the formula III$a$ or III$b$, wherein in respect of A and X that applies which has been stated under the formulae I$a$ and I$b$, and the $R_1'$ s independently of one another represent a hydroxyl group, an unsubstituted or substituted phenoxy group, an alkoxy group having 1–18 carbon atoms, or the two $R_1'$ s together represent the —O— grouping, is reacted, in the molar ratio of 2 : 1, with an oligomer or polymer of the formula IV

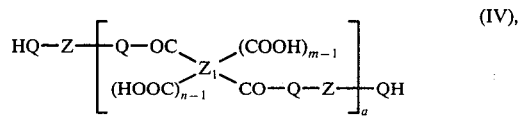

(IV), or with a corresponding cyclised derivative, wherein in respect of $a$, $m$, $n$, $Z_1$, Z and Q or —Q—Z—Q— that applies which has been stated under the formulae I$a$ and I$b$; and the resulting oligomers or polymers of the formula I$a$ or I$b$ are optionally subsequently cyclised and/or converted into another derivative as defined, i.e. into a compound of the formula I$a$ or I$b$ wherein the R s, $R_1$ s or —COR$_2$ s have another meaning as defined.

In the case of eventual cyclisation of the compounds of the formula I$a$ and I$b$ there occurs the formation of imide, and in the case of compounds of the formula I$b$ optionally also of anhydride. Cyclisation is performed, in a manner known per se, chemically or preferably thermally.

Chemical cyclisation is advantageously performed by treatment with a dehydrating agent alone or in admixture with a tertiary amine. It is possible to use, for example, acetic acid anhydride, propionic acid anhydride and dicyclohexylcarbodiimide, or mixtures of acetic acid anhydride and triethylamine.

Thermal cyclisation is performed by heating at temperatures of about 50°–250° C., preferably about 100°–150° C., and optionally with the addition of a solvent and/or of a water-entrainer such as xylenes or toluene. At temperatures above about 150° C. there generally occurs, at least partially, also crosslinking.

The conversion into other oligomers or polymers as defined of the formula I$a$ or I$b$ can be performed in a manner known per se, e.g. by hydrolysation of compounds with anhydride groupings to give the corresponding free acids, reaction of the free acids with alcohols or with salt-forming bases to yield compounds of the formula I$a$ or I$b$, wherein R, $R_1$ or $R_2$ represent alkoxy, phenoxy or —O$^-$M$^+$ groups as defined; or by transesterification.

The compounds of the formulae III$a$ and III$b$ can be obtained by a process wherein an amine of the formula V

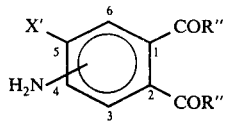

(V)

is reacted with an anhydride of the formula

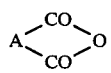

(VI);

and the resulting amidocarboxylic acid of the formula VII

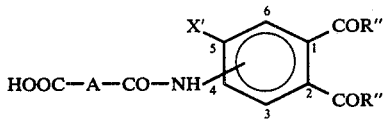  (VII)

is subsequently cyclised and optionally converted into another derivative as defined of the formula IIIa, or into a compound of the formula IIIb.

In the above formulae V to VII, A has the given meaning and X' represents hydrogen or, if the amino group is in the 4-position of the benzene ring, also —$COR_2'$, R" and $R_2'$ represent hydroxyl, phenoxy, alkoxy or —$O^-M^+$ groups corresponding to R or $R_2$, with however phenoxy groups R" and $R_2'$ being free from electronegative substituents, such as nitro groups or halogen atoms, and $R_2'$ having in the case where R" = —OH a meaning other than 13 $O^-M^+$, and in the case where R" = —$O^-M^+$ a meaning other than —OH.

Compounds of the formula IIIa wherein $R_1'$ and/or $R_2$ (where X = —$COR_2$) represent phenoxy groups having electronegative substituents are advantageously produced by reaction of the corresponding anhydrides or acid anhydrides with suitable alcohols; or by transesterification of compounds of the formula IIIa, with $R_1'$ and/or $R_2$ being alkoxy or phenoxy which is free from electronegative substituents.

The reaction of the amines of the formula V with the anhydride of the formula VI can be performed in the melt, in an aqueous or aqueous-organic medium or preferably in an organic medium.

For cyclisation of the amidocarboxylic acids of the formula VII, it is possible to use customary catalysts, such as sodium acetate or triethylamine, and/or dehydrating agents, e.g. acetic acid anhydride. Simultaneously with the formation of imide there occurs under certain circumstances, i.e. depending on the nature of the substituent R", also the formation of anhydride, e.g. if R" = —OH.

The conversion of the resulting compounds into other derivatives, as defined, of the formula IIIa or into compounds of the formula IIIb is performed in a conventional manner, for example by the methods mentioned in the foregoing. Acid chlorides of the formula IIIb can be produced, e.g., by reaction of compounds of the formula IIIa, wherein X = $COR_2$ and $R_2$ = —OH or —$O^-M^+$, with suitable chlorinating agents, such as thionyl chloride.

Oligomers or polymers of the formula IV can be obtained, in a manner known per se, by condensation of di-, tri- or tetracarboxylic acid derivatives of the formula VIII

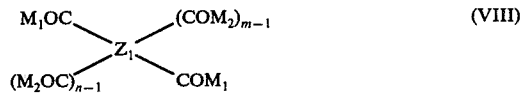  (VIII)

wherein m, n and $Z_1$ have the meanings given under the formulae Ia and Ib, and $M_1$ represents a chlorine atom, a hydroxyl group, an unsubstituted or substituted phenoxy group or an alkoxy group having 1-18 carbon atoms, or $M_1$, if m and/or n = 2, together with an $M_2$ form the —O— grouping, wherein the groups —$COM_1$ and —$COM_2$ are bound to different carbon atoms, and the —$COM_1$ group or groups, if $Z_1$ represents a cyclised radical and m and/or n = 2, is or are in the ortho-position with respect to a —$COM_2$ group, with an excess of a diamine of the formula IX $$HQ — Z — QH \qquad (IX)$$

wherein in respect of Q and Z or —Q—Z—Q— that applies which has been stated under the formulae Ia and Ib; and possible subsequent cyclisation.

It is also possible to use mixtures of different compounds of the formula VIII and diamines of the formula IX.

If $R_1$'s in formula IIIa or $M_1$ s in formula VIII represent unsubstituted or substituted phenoxy groups or alkoxy groups having 1-18 carbon atoms, preferably 1-12 carbon atoms and especially 1-4 carbon atoms, possible groups are, e.g., those mentioned in the foregoing in the discussion of R, $R_1$ and $R_2$.

The diamines of the formula II and IX and also the compounds of the formula VIII are known per se. The following may be mentioned as examples of diamines of the formula II or IX: o-, m- and p-phenylenediamine, diaminotoluenes such as 2,4-diaminotoluene, 1,4-diamino-2-methoxybenzene, 2,5-diaminooxylol, 1,3-diamino-4-chlorobenzene, 4,4'-diaminodiphenylmethane, 4,4'-diaminodiphenyl ether, 4,4'-diaminodiphenylthio ether, 4,4'-diaminodiphenylsulphone, 2,2'-diaminobenzophenone, 4,4'-diaminodiphenylurea, 1,8- or 1,5-diaminonaphthalene, 2,6-diaminopyridine, 2,4-diaminopyrimidine, 1,4-piperazine, 2,4-diamino-s-triazine, di-, tri-, tetra-, hexa-, hepta-, octa-, deca- and dodecamethylenediamine, 2,2-dimethylpropylenediamine, 2,5-dimethylhexamethylenediamine, 4,4-dimethylheptamethylenediamine, 3-methylheptamethylenediamine, 3-methoxyhexamethylenediamine, 2,11-diaminododecane, 2,2,4- and 2,4,4-trimethylhexamethylenediamine, 1,2-bis-(3-aminopropoxy)-ethane, N,N'-dimethylethylenediamine, N,N'-dimethyl-1,6-diaminohexane, as well as the diamines of the formulae $H_2N(CH_2)_3O(CH_2)_2O(CH_2)_3NH_2$ and $H_2N(CH_2)_3S(CH_2)_3NH_2$; and 1,4-diaminocyclohexane.

Examples of suitable di-, tri- and tetracarboxylic acid derivatives of the formula VIII are: malonic acid, dimethylmalonic acid, succinic acid, glutaric acid, adipic acid, suberic acid, sebacic acid and dodecanedicarboxylic acid, 1,3-cyclopentane-dicarboxylic acid, hexahydroisophthalic acid, hexahydroterephthalic acid, terephthalic acid, isophthalic acid, 4,4'-dicarboxydiphenylethane, naphthalene-2,6-dicarboxylic acid, thiophene-2,5-dicarboxylic acid and pyridine-2,3-dicarboxylic acid, as well as the corresponding dichlorides and diesters as defined; trimellitic acid-1,2-anhydride chloride (1,3-dioxobenzo[c]oxalane-5-carboxylic acid chloride), trimellitic acid anhydride as well as esters as defined; pyromellitic acid dianhydride, 3,3',4,4'-benzophenone-tetracarboxylic acid dianhydride, 2,3,3',4'-benzophenone-tetracarboxylic acid dianhydride, 2,2',3,3'-benzophenone-tetracarboxylic acid dianhydride, 3,3'4,4'-diphenyltetracarboxylic acid dianhydride, bis-(2,3-dicarboxyphenyl)-methanedianhydride, bis-(2,5,6-trifluoro-3,4-dicarboxyphenyl)-methanedianhydride, 2,2-bis-(2,3-dicarboxyphenyl)-propane-dianhydride, bis-(3,4-dicarboxyphenyl)-etherdianhydride, bis-(3,4-dicarboxyphenyl)-sulphone dianhydride N,N-(3,4-dicarboxyphenyl)-N-methylamine dianhydride, bis-(3,4-dicarboxyphenyl)-diethylsilane dianhydride, 2,3,6,7;1 -and 1,2,5,6-naphthalenetetracarboxylic acid dianhydride, 2,6-dichloronaphthalene-1,4,5,8-tetracarboxylic acid dianhydride, thiophene-2,3,4,5-tetracarboxylic acid dianhydride, pyrazine-2,3,5,6-tetracarboxylic acid dianhydride and pyridine-2,3,5,6-tetracarboxylic acid dianhydride.

As dicarboxylic acid derivatives are preferably used dicarboxylic acid dichlorides.

The condensation of the compounds of the formulae IIIa, IIIb and VIII with the oligomers or polymers of the formula IV or the diamines HQ—Z—QH is performed in a manner known per se, advantageously at temperatures of about −50° C. to +300° C. The condensation can be performed in the melt or preferably in an inert organic solvent or in a solvent mixture. Temperatures of −20° C. to +50° C. are preferred for the condensation in solutions. For the reaction of the compounds of the formulae IIIa and IIIb with the compounds of the formula IV, the addition of known polymerisation inhibitors, such as hydroquinones, brenzcatechin or cresols, e.g. di-tert.butyl cresol, can under certain circumstances be advantageous.

As organic solvents it is possible to use, e.g.:

optionally chlorinated aromatic hydrocarbons, such as benzene, toluene, xylenes and chlorobenzene;

chlorinated aliphatic hydrocarbons, such as methylene chloride, chloroform, tetrachloroethane and tetrachloroethylene;

aliphatic and cycloaliphatic ketones, such as acetone, methyl ethyl ketone, cyclopentanone and cyclohexanone;

cyclic ethers, such as tetrahydrofuran, tetrahydropyrane and dioxane;

cyclic amides, such as N-methyl-2-pyrrolidone, N-acetyl-2-pyrrolidone and N-methyl-ε-caprolactam;

N,N-dialkylamides of aliphatic monocarboxylic acids having 1–3 carbon atoms in the acid moiety, such as N,N-dimethylformamide, N,N-dimethylacetamide, N,N-diethylacetamide and N,N-dimethylmethoxyacetamide;

ethylene glycol monoalkyl ether and ethylene glycol dialkyl ether each having 1–4 carbon atoms in the alkyl moieties, such as ethylene glycol monomethyl ether, ethylene glycol monoethyl ether, ethylene glycol monoisopropyl ether and ethylene glycol mono-n-butyl ether, ethylene glycol dimethyl ether and ethylene glycol diethyl ether;

alkyl esters of aliphatic monocarboxylic acids having a total of 2–6 carbon atoms, such as formic acid or acetic acid methyl ester, formic or acetic acid ethyl ester and formic acid or acetic acid n-butyl ester;

hexamethylphosphoric acid triamide (hexametapol); N,N,N',N'-tetramethylurea;

tetrahydrothiophene dioxide (sulpholane); and dialkyl sulphoxides, such as dimethyl and diethyl sulphoxide.

It is also possible to use mixtures of such solvents.

Preferred solvents are N,N-dialkylamides of aliphatic monocarboxylic acids having 1–3 carbon atoms in the acid moiety, especially N,N-dimethylacetamide, as well as cyclic amides, such as N-methyl-pyrrolidone.

The hydrochloric acid forming on condensation or polycondensation of compounds of the formula IIIb or VIII, wherein $M_1$ represents chlorine, with the oligomers or polymers of the formula IV or the diamines of the formula IX, can be removed by neutralisation with basic substances such as calcium hydroxide or triethylamine, or by reaction with an epoxide compound such as ethylene oxide or propylene oxide, and by washing out with suitable solvents, e.g. water. The condensation reactions are advantageously performed with the exclusion of moisture, e.g. in an inert-gas atmosphere, such as nitrogen.

By heating of the crosslinkable mixtures according to the invention at temperatures of between about 100° and 300° C., preferably between 100° and 200° C., it is possible to produced imidised or cyclised, and optionally partially crosslinked, pre-polymers. The pre-polymers according to the invention still contain crosslinkable groups, are soluble in the usual organic solvents, such as N,N-dimethylformamide, N,N-dimethylacetamide and N-methylpyrrolidone, and can also be processed in general from the melt. The pre-polymers can be produced by known methods, e.g. in the melt, or in the presence of an inert organic solvent, e.g. those of the aforementioned type or mixtures thereof.

Preferred solvents for the production of the pre-polymers are: N,N-dialkylamides of aliphatic monocarboxylic acids having 1–3 carbon atoms in the acid moiety, especially N,N-dimethylacetamide, methylene chloride, chloroform and cyclic amides, such as N-methyl-2-pyrrolidone. Depending on the purpose of application, it can also be advantageous to perform the reaction in the presence of catalytic amounts of a strong acid (about 0.5–5 percent by weight, relative to the weight of the compound of the formula Ia and/or Ib), and optionally in the presence of a radical initiator or of a radical inhibitor.

Strong acids which can be used are, for example, inorganic or organic acids having a pKa value in water of below 5, such as hydrochloric, hydrobromic and hydrofluoric acid, perchloric acid, sulphuric acid, phosphoric acid, nitric acid, aromatic or aliphatic sulphonic acids and saturated or unsaturated aliphatic carboxylic acids, such as methanesulphonic acid, benzenesulphonic acid, p-toluenesulphonic acid, dichloro- and trichloroacetic acid, trifluoroacetic acid and maleic acid.

Examples of suitable radical initiators are inorganic and organic peroxides or azo compounds, e.g. hydrogen peroxide, tert.butylhydroxy peroxide, peracetic acid, benzoyl peroxide, tert.butylperbenzoate, cumolhydroperoxide, dicumyl peroxide and α,α'-azoisobutyronitrile.

Suitable radical inhibitors are, e.g., hydroquinone, brenzcatechin, di-tert.butyl cresol, picric acid and diphenylpicryl hydrazine.

The pre-polymers according to the invention can be converted in a second stage, by known methods, into fully crosslinked products, which are insoluble in the customary organic solvents. Alternatively, it is also possible to process and to crosslink directly the mixtures, according to the invention, of compounds of the formula Ia and/or Ib and diamines. The crosslinking can be performed, in a known manner, chemically or thermally, or under the influence of electromagnetic waves, especially light.

Chemical crosslinking is generally performed at temperatures of about 50° to 250° C., in the presence of radical initiators of the aforementioned type. Thermal crosslinking is performed advantageously by heating at temperatures of about 350° C., preferably 150°–250° C., and also radical initiators may be concomitantly used. Cross-linking under the influence of electromagnetic waves can be performed, e.g. by irradiation with X rays or with UV light, and optionally in the presence of sensitisers, such as benzene, 1,4-diacetylbenzene, phenol, benzonitrile, acetophenone, benzophenone, benzaldehyde, di-isopropyl ketone and fluorene.

The mixtures and pre-polymers according to the invention are suitable for the production of industrial products such as fibres, films (sheets), coating compounds, lacquers, foam plastics, adhesives, laminating resins, composite materials, moulding powders, moulded articles and so forth, in a manner known per se and optionally with the use of customary additives, such as pigments, fillers, etc. The pre-polymers according to the invention can also be processed from the melt. The products obtained on crosslinking have good mechanical, electrical and/or thermal properties. They are distinguished in particular by their high thermooxidative stability.

EXAMPLE 1

In a nitrogen atmosphere in a sulphonating flask, 15.86 g (0.08 mole) of 4,4'-diaminodiphenylmethane is dissolved in 180 ml of anhydrous dimethylacetamide (DMA), and the solution is cooled to −15° to −20° C. With stirring, 12.63 g (0.06 mole) of trimellitic acid anhydride chloride in solid form is added portionwise in such a manner that the temperature of the reaction solution does not exceed −15° C. The solution is then stirred at −15° C. for 30 minutes and at 20°–25° C. for one hour. 6.07 g (0.06 mole) of triethylamine in 50 ml of DMA is then added dropwise, whereupon a fine precipitate is formed. The reaction mixture is stirred for a further hour at 20°–25° C., and an addition is subsequently made portionwise at 15°–20° C. of 9.72 g (0.04 mole) of a 1:1 mixture of 3- and 4-maleimidylphthalic acid anhydride. After one hour's stirring at 20°–25° C., the precipitated triethylamine hydrochloride is separated by filtration. To the filtered reaction solution is then added dropwise, with stirring, 160 ml of acetic acid anhydride and stirring is continued at 20°–25° C. for 16 hours. The reaction solution is subsequently poured onto water, the precipitated product is separated, washed several times with water and dried in a vacuum drying chamber for 16 hours at 80° C./100 torr and for 16 hours at 80° C./10$^{-2}$ torr. 32 g of a crosslinkable oligoamideimide in the form of a yellow powder is obtained.

12.84 g (0.0075 mole) of the above oligoamide-imide and 0.89 g (0.0045 mole) of 4,4'-diaminodiphenylmethane are dissolved in 85 ml of anhydrous DMA, and the solution is heated in a nitrogen atmosphere, with stirring, at 130° C. for 2 hours 30 minutes. The solution obtained, after cooling to about 25° C., is poured into ice water; the precipitated product is filtered off, washed with water and dried for 20 hours at 80° C./100 torr and 80° C./10$^{-1}$ torr, respectively.

For processing by the compression process, the prepolymer obtained is introduced into a compression mould, preheated to 240° C., for circular discs, and moulded at this temperature for 35 minuts under a pressure of 450 kp/cm². Annealing for 16 hours at 240° C. yields solid moulded specimens having good electrical properties.

EXAMPLE 2

In a nitrogen atmosphere in a sulphonating flask, 4.32 g (0.04 mole) of m-phenylenediamine is dissolved in 100 ml of anhydrous DMA, and the solution is cooled to −15° to −20° C. With stirring, 8.37 g (0.035 mole) of sebacic acid dichloride is added dropwise in such a manner that the temperature of the reaction mixture does not exceed −15° C. The reaction mixture is then stirred at 20°–25° C. for a further hour. With renewed cooling to −15° C., 7.08 g (0.07 mole) of triethylamine in 14 ml of DMA is added dropwise, whereupon a white precipitate is formed. The reaction mixture is stirred at 20°–25° C. for a further hour, and the precipitated triethylamine hydrochloride is separated by filtration. The precipitate is washed with 30 ml of DMA, and to the filtrate is added at 0° C. 2.43 g (0.01 mole) of 3-maleimidylphthalic acid anhydride. The resulting reaction solution is stirred for 2 hours at 20°–25° C. 80 ml of acetic acid anhydride is then added; the reaction solution is stirred for 16 hours at 20°–25° C., and is finally poured into water. The precipitated product is filtered off, washed several times with water and dried in a vacuum drying chamber for 16 hours at 80° C./20 torr and for 16 hours at 80° C./10$^{-1}$ torr. There is obtained 11.1 g of a crosslinkable oligoamide.

3.0 g (about 1.5 mMol) of this oligoamide is mixed with 0.178 g (0.9 mMol) of 4,4'-diaminodiphenylmethane at 200° C. in the melt. The mixture is maintained for 10 minutes at this temperature and, after cooling, ground to a fine powder. This is moulded, by the compression process analogous to that in Example 1, at 225°–230° C. for 30 minutes under a pressure of 325 kp/cm² into the form of transparent discs having a good mechanical strength.

The 3-maleimidylphthalic acid anhydride used in the foregoing Examples can be produced, in a manner known per se, by reaction of 3-aminophthalic acid with maleic acid anhydride and cyclisation of the resulting amide acid with anhydrous sodium acetate and acetic anhydride (see DOS 2,459,673).

EXAMPLE 3

By the procedure described in Example 1, 1.62 g (0.015 mole) of m-phenylenediamine, 2.03 g (0.01 mole) of isophthalic acid dichloride, 2.02 g (0.02 mole) of triethylamine and 2.43 g (0.01 mole) of 3-maleimidylphthalic acid anhydride are reacted in 40 ml of anhydrous DMA. To the formed reaction mixture is added 0.59 g (0.003 mole) of 4,4'-diaminodiphenylmethane, and the mixture is stirred for 1 hour at 20°–25° C. After removal by filtration of the resulting precipitate (triethylamine hydrochloride), the reaction solution is poured onto aluminium plates. The coatings are dried for 16 hours at 80° C./20 torr, 1 hour respectively at 100° C./20 torr, 120° C./20 torr and 140° C./20 torr, 2 hours at 150° C./20 torr and for 16 hours at 200° C./10$^{-10}$. Transparent, slightly brittle coatings are obtained.

EXAMPLE 4

2.48 g (0.0125 mole) of 4,4'-diaminodiphenylmethane is dissolved in 27 ml of anhydrous DMA in a nitrogen atmosphere in a sulphonating flask, and the solution is cooled to −15° C. With stirring, 2.03 g (0.01 mole) of isophthalic acid dichloride is added portionwise in such a manner that the temperature does not exceed −15° C. Stirring is continued for 30 minutes at −15° C. and for 1 hour at 20°–25° C. The reaction mixture is then cooled again to −15° C., and 2.02 g (0.02 mole) of triethylamine in 2 ml of DMA is added dropwise. The mixture is stirred for 1 hour at 20°–25° C. and then cooled again to −15° C., whereupon 2.91 g (0.01 mole) of 4-maleimidyltrimellitic acid anhydride chloride is added. After a further 1 hour's stirring at 20°–25° C. and subsequent cooling to −15° C., an addition is made dropwise of 0.50 g (0.005 mole) of triethylamine in 2 ml of DMA. Stirring is again performed for one hour at 20°–25° C., and 0.20 g (0.001 mole) of 4,4'-diaminodiphenyl ether is added. After a further one hour's stirring at 20°–25° C., the precipitated triethylamine hydrochloride is filtered off and the reaction solution is poured onto aluminium plates.

Curing is performed for 6 hours at 100° C./20 torr, 1 hour at 120° C./20 torr, one hour at 150° C./20 torr and 16 hours at 200° C./10$^{-1}$ torr. Transparent flexible coatings are obtained.

The 4-maleimidyltrimellitic acid anhydride chloride used in the above Example can be produced as follows: 102 g (0.4 mole) of 4-nitrotrimellitic acid (obtained by nitration of trimellitic acid anhydride with H$_2$SO$_4$/HNO$_3$) is hydrogenated in the presence of 10 g of a palladium charcoal catalyst, containing 5% by weight of Pd, at 30° C. in 1000 ml of dioxane. The reaction solution is filtered and 64.8 g (0.48 mole) of maleic acid anhydride is then added. The reaction mixture is allowed to stand for 12 hours at 20°–25° C. and is subsequently concentrated to dryness at 60° C. in a rotary evaporator. The residue is heated twice to boiling, with stirring, with 400 ml of acetic acid ethyl ester each time, and dried at 80° C./100 torr for 24 hours to obtain 105 g of 4-maleamidyltrimellitic acid. 32.2 g (0.1 mole) of the 4-maleamidyltrimellitic acid is mixed with 1.6 g of anhydrous sodium acetate and 83 ml of acetic anhydride and heated for 30 minutes at 80° C. The resulting solution is concentrated by evaporation to dryness and subsequently dried at 50° C./0.05 torr. To the residue is added 200 ml of thionyl chloride, and the reaction mixture is heated at 80° C. for 2.5 hours. It is then concentrated to dryness; 150 ml of benzene is added, filtration is performed and the filtrate is concentrated by evaporation and finally dried at 80° C./0.1 torr. On washing with cyclohexane and benzene and drying, there is obtained 18.31 g of crystalline 4-maleimidyltrimellitic acid anhydride chloride, m.p. 143°–144° C.

We claim:

1. A crosslinkable mixture, essentially unpolymerized and stable at temperatures up to about 100° C., consisting of at least one oligomer or polymer of the formula Ia or Ib

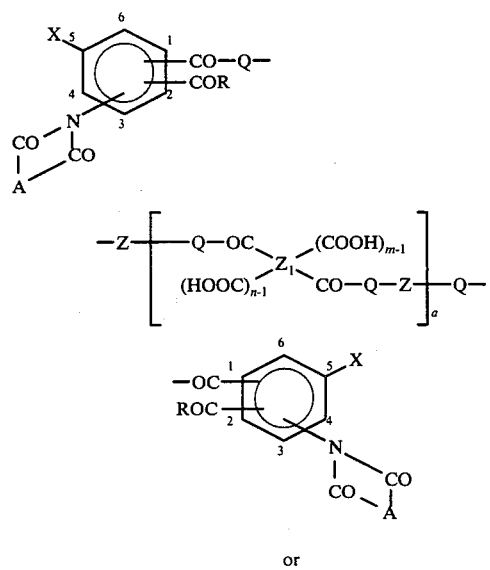

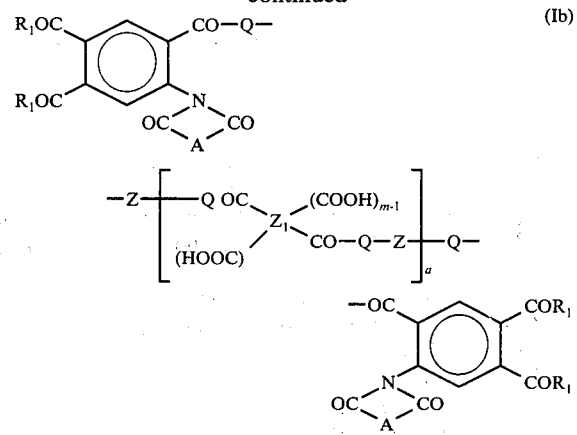

where in formula Ia the

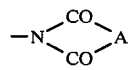

groups independently of each other are linked to the benzene rings in the 3- or 4- position; and a carbonyl of the —COQZ$_a$QOC— moiety and a —COR group are attached in pairs to adjacent carbon atoms at the 1- and 2- positions of the benzene rings, whereby on each benzene ring one of said carbonyl and —COR groups can be in the 1-position and the other in the 2-position; or of a corresponding cyclised derivative, and of at least one diamine of the formula II $$HQ - Z_2 - QH \qquad (II)$$

whereby the molar ratio of oligomer or polymer of the formula Ia and/or Ib, or of a corresponding cyclised derivative, to diamine of the formula II is between about 1.2:1 and 50:1, and wherein the X's independently of one another represent hydrogen or, if the radical

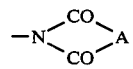

is in the 4-position of the benzene ring, also —COR$_2$, the R's and R$_2$'s independently of one another represent a hydroxyl group, phenoxy; phenoxy substituted by one or two nitro groups, by one alkyl of 1 to 2 carbon atoms, by one alkoxy of 1 to 2 carbon atoms or by two to five halogen atoms; alkoxy of 1 to 18 carbon atoms or an O$^-$M$^+$ group, the R$_1$'s independently of one another represent a hydroxyl group, phenoxy; phenoxy substituted by one or two nitro groups, by one alkyl of 1 to 2 carbon atoms, by one alkoxy of 1 to 2 carbon atoms or by two to five halogen atoms; alkoxy of 1 to 18 carbon atoms or an O$^-$M$^+$ group, or two adjacent R$_1$'s together represent the —O— grouping, the A s independently of one another represent a radical of the formula

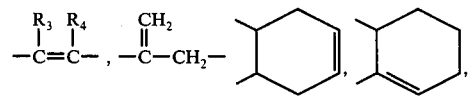

-continued

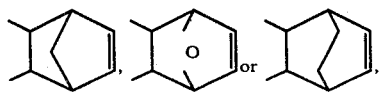

$R_3$ and $R_4$ independently of one another represent hydrogen, chlorine, bromine or methyl, $M^+$ represents an alkali metal cation, a trialkylammonium cation having 3-24 carbon atoms, or a quaternary ammonium cation, $a$ represents a number from 1-100, $m$ and $n$ independently of one another represent the number 1 or 2, the Z's and $Z_2$'s independently of one another represent an aliphatic radical having at least 2 carbon atoms, a cycloaliphatic, carbocylic-aromatic or heterocyclic-aromatic radical, the Q's represent —NH—, or —Q—Z—Q— or —Q—$Z_2$—Q— represent the grouping

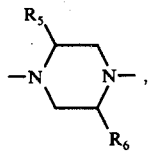

the $Z_1$'s represent an aliphatic radical having at least two carbon atoms, or a cycloaliphatic, carbocyclic-aromatic or heterocyclic-aromatic radical, in which the carbon-amide groups and carboxyl groups are bound to different carbon atoms, and the carboxyl groups, if $Z_1$ represents a cyclic radical and at least one of $m$ and $n$ represetns the number 2, are each in the ortho-position with respect to a carbonamide group, and $R_5$ and $R_6$ independently of one another represent hydrogen, methyl or phenyl.

2. A crosslinkable mixture according to claim 1, which contains at least one oligomer or polymer of the formula Ia, or a corresponding cyclised derivative, wherein the two radicals

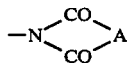

independently of one another are each in the 3- or 4-position of the benzene ring, R represents a hydroxyl group, X represents hydrogen, and A represents a radical —CH=CH—.

3. A crosslinkable mixture according to claim 1, which contains at least one oligomer or polymer of the formula Ib, or a corresponding cyclised derivative, wherein A represents the radical —CH=CH—, and the $R_1$'s each represent a hydroxyl group, or two adjacent $R_1$'s together represent the —O— grouping.

4. A crosslinkable mixture according to claim 1, which contains at least one oligomer or polymer of the formula Ia or Ib, or a corresponding cyclised derivative, and at least one diamine of the formula II, wherein Q represents —NH—, the Z 's and $Z_2$'s independently of one another represent an unsubstituted alkylene group having 2-10 carbon atoms, the 1,3- or 1,4-phenylene group, the 4,4'-diphenyl ether group, 4,4'-diphenylsulphone group or 4,4'-diphenylmethane group, and $Z_1$ represents an unsubstituted alkylene group having 2-10 carbon atoms, the 1,3- or 1,4-phenylene group, a benzenetriyl or benzenetetrayl group or the benzophenone ring system.

5. A crosslinkable mixture according to claim 1, which contains at least one oligomer or polymer of the formula Ia or Ib, or a corresponding cyclised derivative, wherein A represents a radical —CH=CH—, X represents hydrogen, R represents a hydroxyl group, $R_1$'s each represent a hydroxyl group, or two adjacent $R_1$'s together represent the —O— grouping, $a$ represents an integer from 1-10, Q represents —NH—, where $m$ and $n = 1$, Z represents the 1,3- or 1,4-phenylene group, the 4,4'-diphenylmethane group or 4,4'-diphenyl ether group, and $Z_1$ represents an alkylene group having 2-10 carbon atoms, the 1,3- or 1,4-phenylene group, with only one of Z and $Z_1$ representing a 1,4-phenylene group, or, if $m$ and $n = 2$, Z represents the 4,4'-diphenylmethane group or 4,4'-diphenyl ether group, and $Z_1$ represents a benzenetetrayl group or the benzophenone ring system, and, where $m = 1$ and $n = 2$, Z represents the 4,4'-diphenylmethane group or 4,4'-diphenyl ether group, and $Z_1$ represents a benzenetriyl group.

6. A crosslinkable mixture according to claim 1 having a molar ratio of oligomer or polymer of the formula Ia and/or Ib, or of a corresponding cyclised derivative, to diamine of the formula II of about 1.3 : 1 to 10 : 1.

7. A crosslinkable mixture according to claim 1, which contains as diamine of the formula II 4,4'-diaminodiphenylmethane or 4,4'-diaminodiphenyl ether.

8. A crosslinked polymer obtained by heating a mixture according to claim 1 at a temperature of about 50° to 250° C. in the presence of a radical initiator selected from the group consisting of inorganic peroxides, organic peroxides and azo compounds.

9. A crosslinked polymer obtained by heating a mixture according to claim 1 at a temperature of about 150° to 350° C.

10. A crosslinked polymer obtained by subjecting a mixture according to claim 1 to irradiation by electromagnetic waves selected from the group consisting of X-rays and UV light.

11. A crosslinked polymer according to claim 10 where the electromagnetic irradiation is carried out in the presence of a sensitizer selected from the group consisting of benzene, 1,4-diacetylbenzene, phenol, benzonitrile, acetophenone, benzophenone, benzaldehyde, diisopropyl ketone and fluorene.

* * * * *